(12) United States Patent
Taki

(10) Patent No.: US 11,177,969 B2
(45) Date of Patent: Nov. 16, 2021

(54) INTERFACE DEVICE AND DATA COMMUNICATION METHOD

(71) Applicant: Toshiba Memory Corporation, Tokyo (JP)

(72) Inventor: Daisuke Taki, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 149 days.

(21) Appl. No.: 16/288,070

(22) Filed: Feb. 27, 2019

(65) Prior Publication Data

US 2020/0092119 A1 Mar. 19, 2020

(30) Foreign Application Priority Data

Sep. 18, 2018 (JP) .............................. JP2018-173911

(51) Int. Cl.
*H04L 12/14* (2006.01)
*H04L 12/54* (2013.01)
*H04L 12/70* (2013.01)

(52) U.S. Cl.
CPC ...... *H04L 12/1407* (2013.01); *H04L 12/1435* (2013.01); *H04L 12/1492* (2013.01); *H04L 12/5601* (2013.01); *H04L 2012/5684* (2013.01)

(58) Field of Classification Search
CPC ..... H04L 69/08; H04L 12/66; H04L 41/0226; H04W 88/06; H04W 28/10; H04W 36/28; H04W 40/24; H04W 72/1215; H04W 80/04

See application file for complete search history.

(56) References Cited

U.S. PATENT DOCUMENTS

| | | | |
|---|---|---|---|
| 5,835,738 A | 11/1998 | Blackledge, Jr. et al. | |
| 6,594,701 B1 * | 7/2003 | Forin ................... | G06F 12/1081 709/232 |
| 7,752,376 B1 * | 7/2010 | Johnsen .............. | G06F 13/4022 710/311 |
| 7,911,952 B1 * | 3/2011 | Nygreen ................ | H04L 47/13 370/235 |
| 9,588,931 B2 | 3/2017 | Wong et al. | |
| 2004/0088469 A1 * | 5/2004 | Levy ................... | G06F 13/4282 710/316 |

(Continued)

*Primary Examiner* — Romani Ohri
(74) *Attorney, Agent, or Firm* — Kim & Stewart LLP

(57) ABSTRACT

An interface device includes a conversion circuit that converts data that conforms to a first communication interface standard into data that conforms to a second communication interface standard, first and second flow control units that execute respectively a first flow control that conforms to the first communication interface standard on the first device, and a second flow control that conforms to the second communication interface standard on the second device, first and second communication circuits that receive data from and transmit data to the first device under control of the first flow control unit and the second device under control of the second flow control unit, respectively. Data is transmitted from the second to the first device in accordance with first and second credits used in the first and second flow controls, respectively, and a data amount associated with the first credit is equivalent to a data amount associated with the second credit.

14 Claims, 11 Drawing Sheets

(56) References Cited

U.S. PATENT DOCUMENTS

| | | | |
|---|---|---|---|
| 2005/0131986 A1* | 6/2005 | Haagens | H04L 47/10 709/201 |
| 2006/0224750 A1* | 10/2006 | Davies | H04W 4/12 709/229 |
| 2008/0072098 A1* | 3/2008 | Hunsaker | H04L 47/39 713/501 |
| 2014/0019653 A1* | 1/2014 | Amchislavsky | G06F 13/385 710/106 |
| 2015/0242318 A1* | 8/2015 | Bernard | G06F 12/0813 711/130 |
| 2015/0256654 A1* | 9/2015 | Oguchi | H04L 43/0841 709/230 |
| 2018/0004685 A1* | 1/2018 | Bhatt | G06F 13/4027 |
| 2018/0019939 A1* | 1/2018 | Finkelstein | H04L 45/16 |
| 2019/0045421 A1* | 2/2019 | Shah | H04W 40/02 |
| 2019/0334810 A1* | 10/2019 | Nandy | H04L 45/28 |
| 2019/0370173 A1* | 12/2019 | Boyer | G06F 12/0888 |

\* cited by examiner

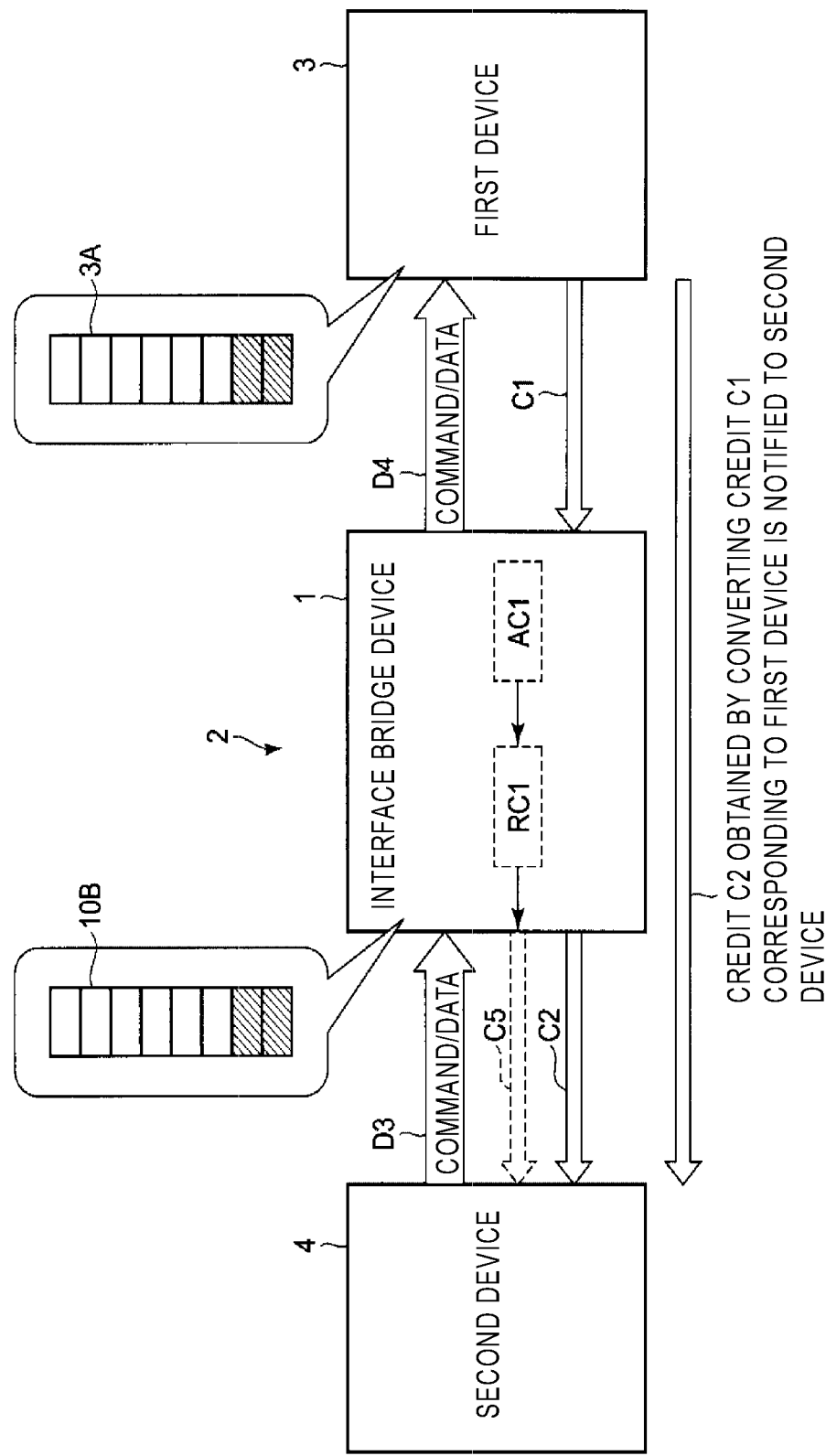

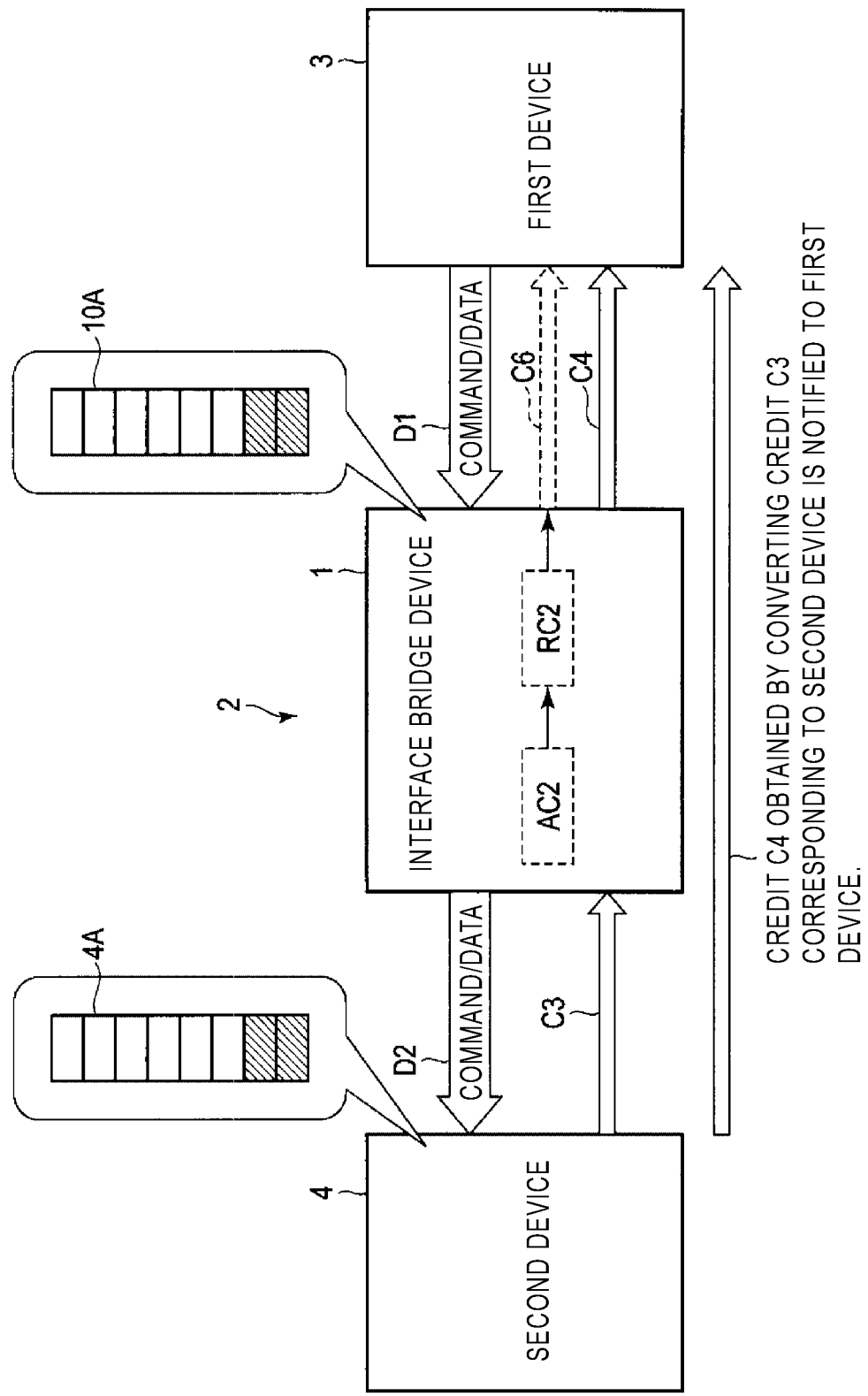

FIG.4

| FIRST COMMUNICATION INTERFACE OPENCAPI | COMPARISON CONTENTS | SECOND COMMUNICATION INTERFACE GEN-Z |
|---|---|---|
| PACKET CREDIT | CREDIT MANAGEMENT METHOD | COMMAND CREDIT+DATA CREDIT |
|  | COMMAND CREDIT | ASSIGN ONE CREDIT PER ONE COMMAND |
|  | DATA CREDIT | ASSIGN ONE CREDIT PER 64 BYTES |
| ASSIGN ONE CREDIT PER 16 BYTES | PACKET CREDIT |  |
| REMAINING CAPACITY OF RECEIVE BUFFER MEMORY | MEANING OF CREDIT | NUMBER OF COMMAND/DATA PERMITTED TO BE TRANSMITTED |
| 8 BYTES | MINIMUM PACKET LENGTH |  |
|  | MAXIMUM COMMAND LENGTH | 21 BYTES (3.5 BYTES X 6 SLOTS) |

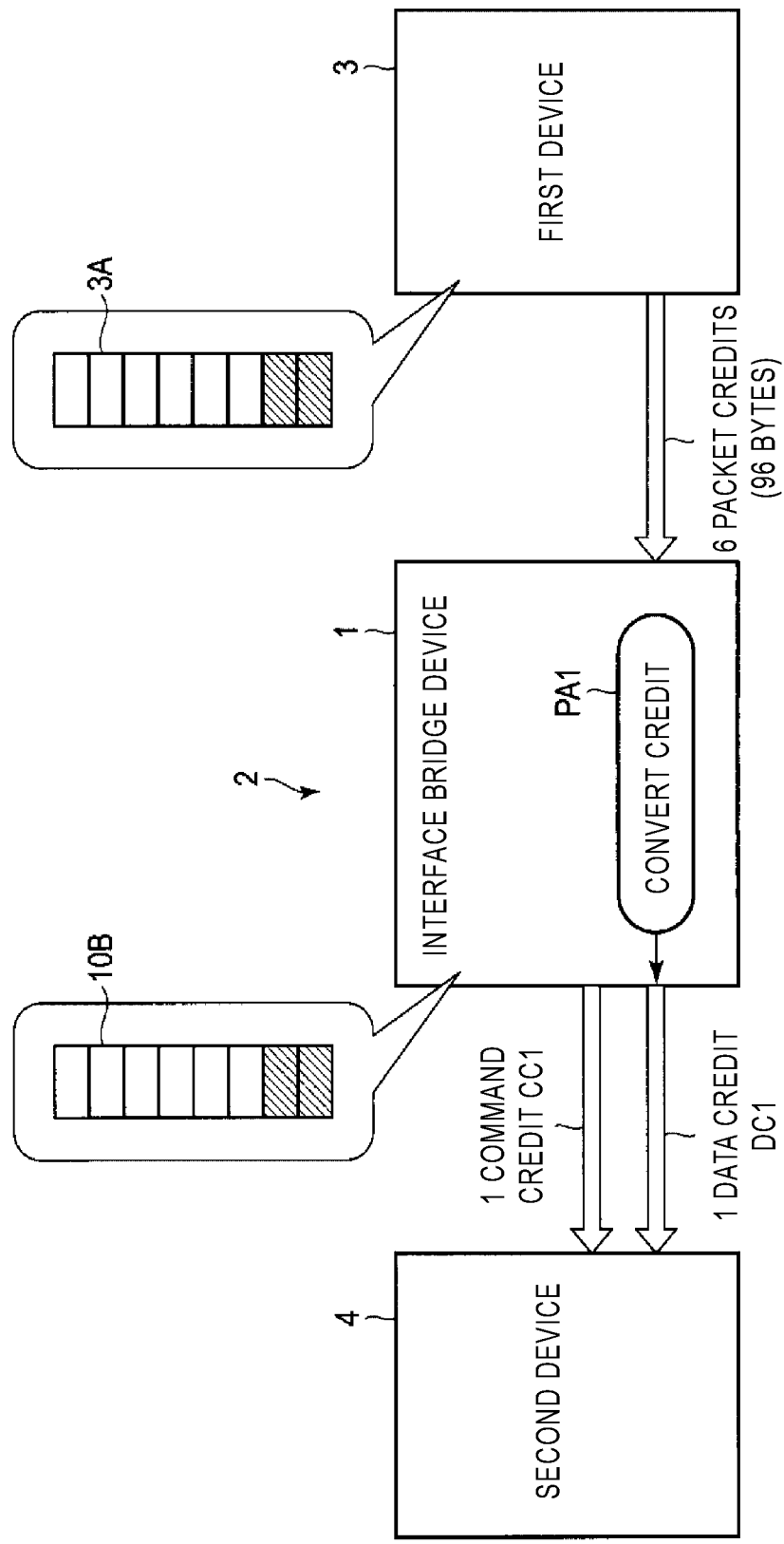

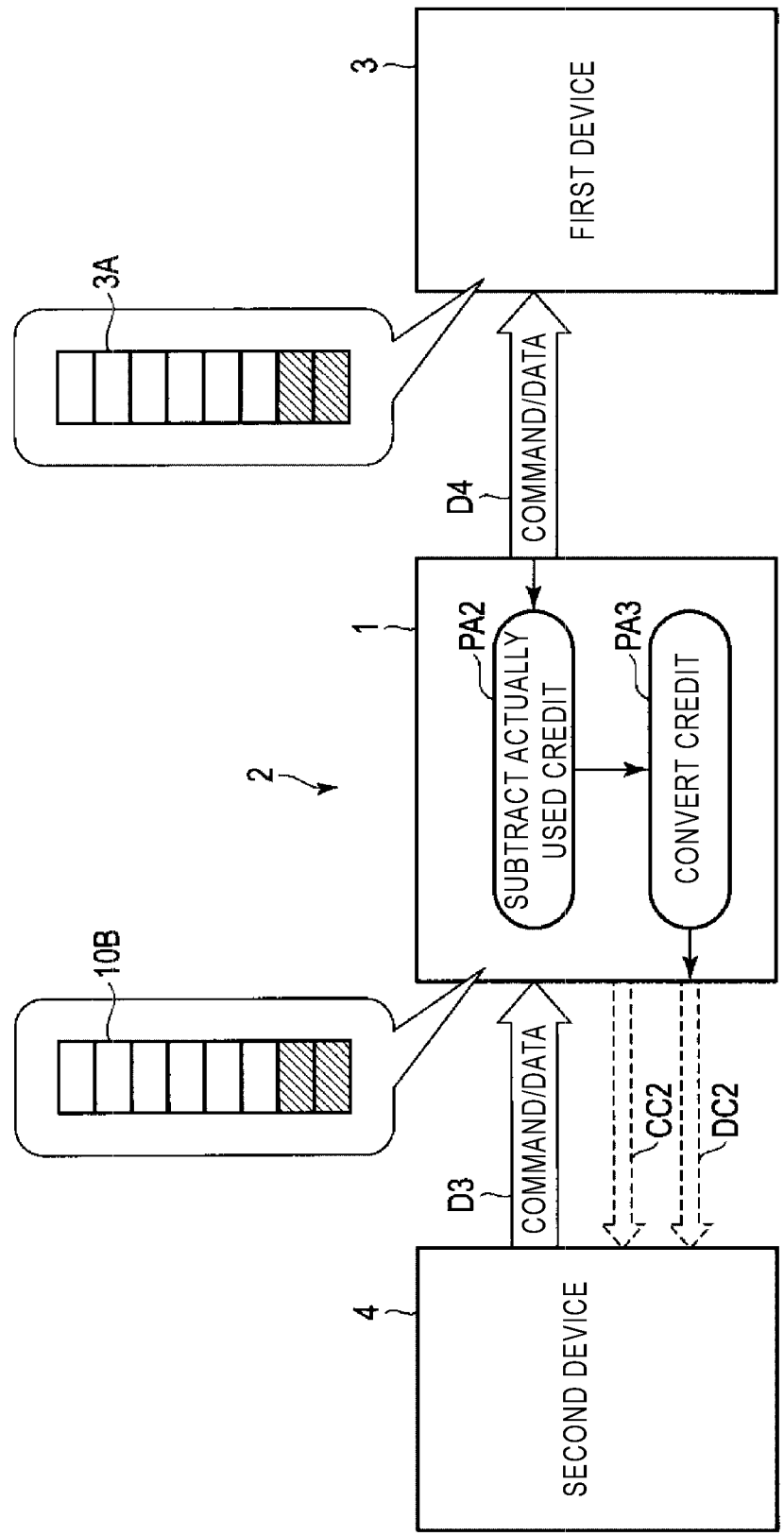

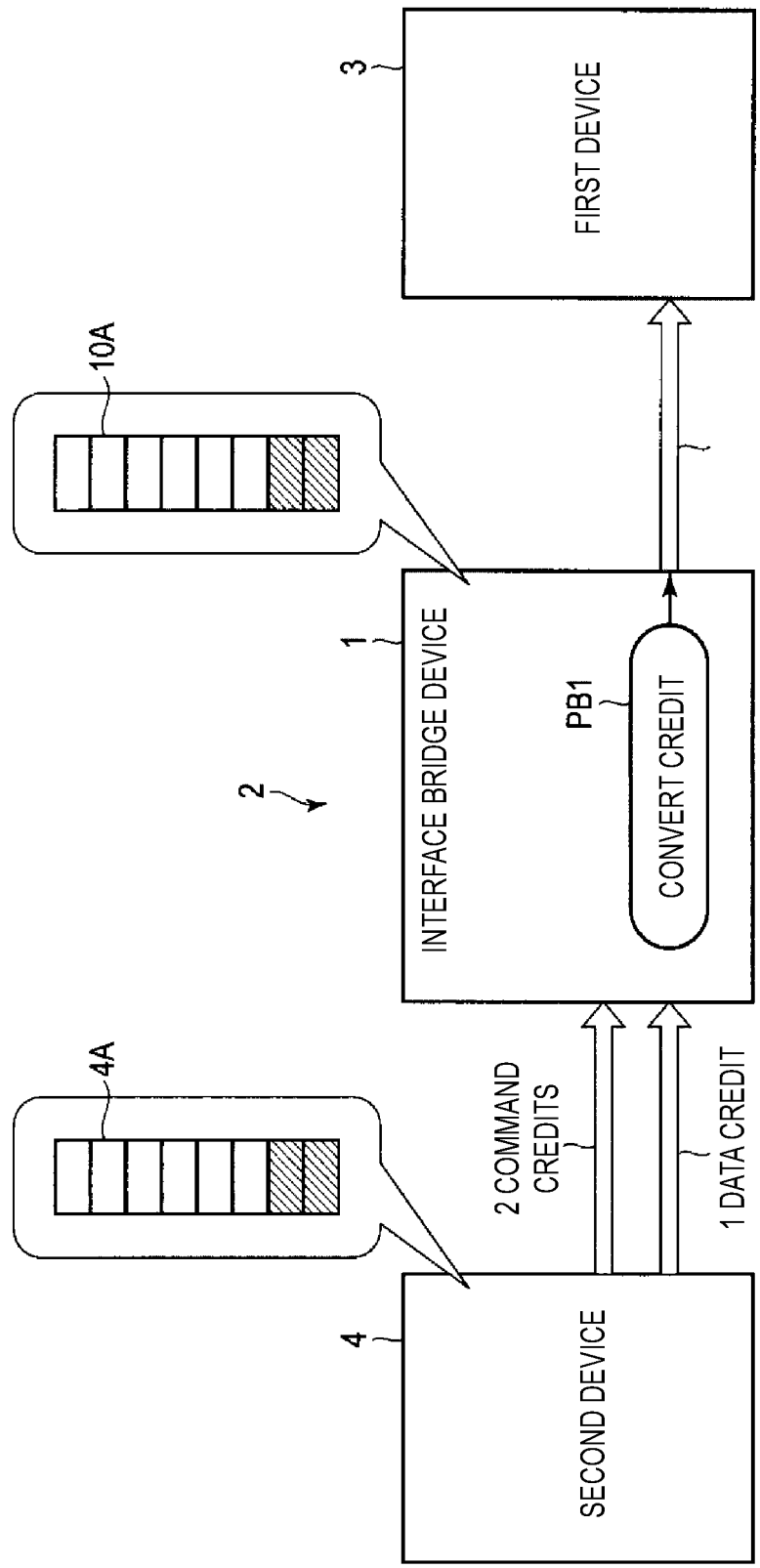

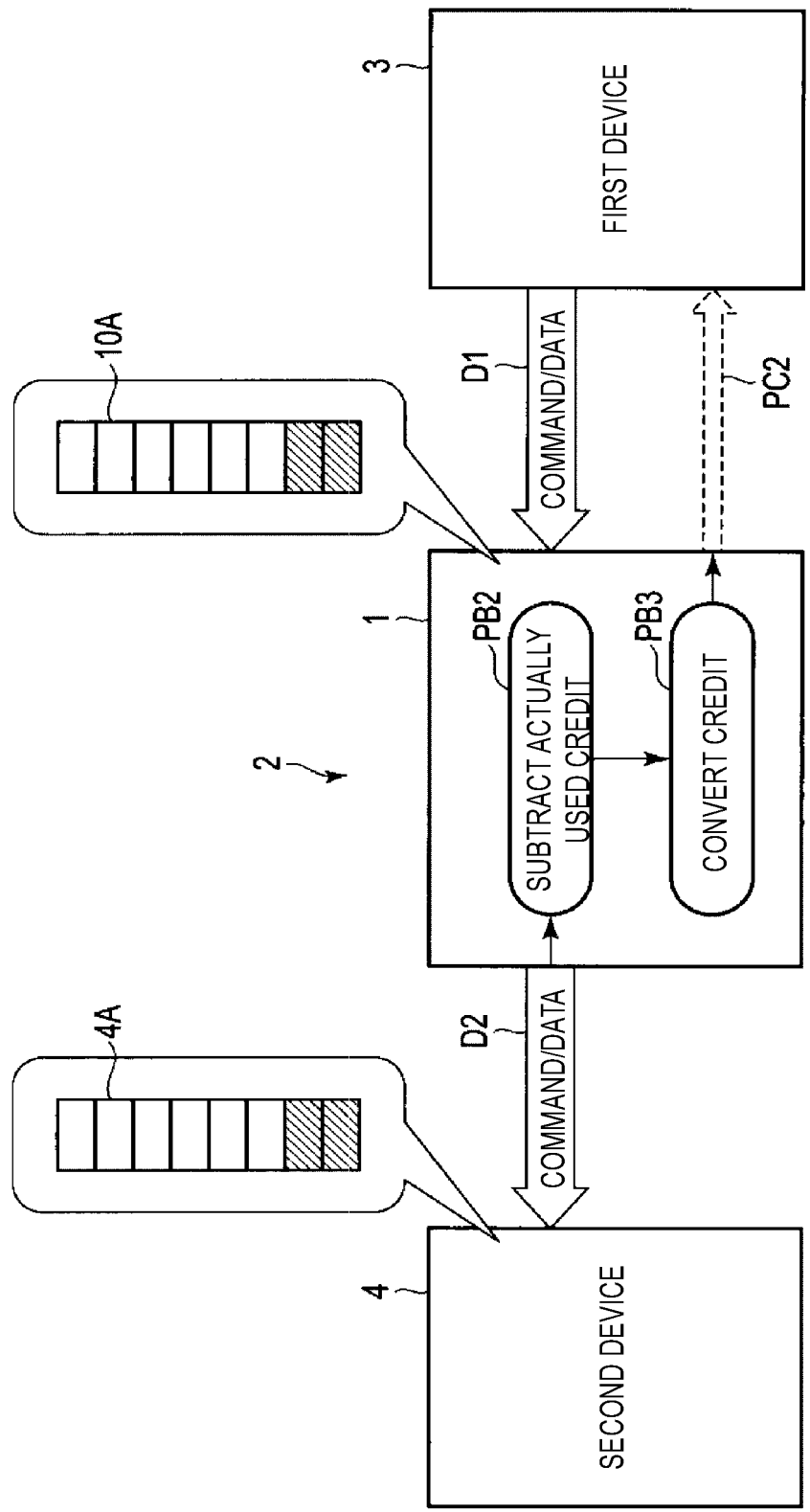

INTERFACE DEVICE AND DATA COMMUNICATION METHOD

CROSS-REFERENCE TO RELATED APPLICATION

This application is based upon and claims the benefit of priority from Japanese Patent Application No. 2018-173911, filed Sep. 18, 2018, the entire contents of which are incorporated herein by reference.

FIELD

Embodiments described herein relate generally to an interface device, a program, and a data communication method.

BACKGROUND

In recent years, many high-speed communication interfaces have been proposed by various organizations or companies. By using a high-speed communication interface, large-size data can be communicated at a high speed from a transmitting-side device to a receiving-side device. It is often necessary to convert a data communication that conforms to a specific communication interface into a data communication that conforms to another communication interface.

DESCRIPTION OF THE DRAWINGS

FIGS. 2 and 3 are block diagrams illustrating an example of a communication system in which an amount of a command/data communication between two devices is controlled using credits.

FIG. 4 is a table illustrating differences in a first communication interface and a second communication interface.

FIG. 9 is a block diagram illustrating an example of credit conversion by an interface bridge device according to a second embodiment.

FIG. 10 is a block diagram illustrating an example of effectively using a remaining credit by the interface bridge device according to the second embodiment.

FIG. 11 is a block diagram illustrating an example of credit conversion by an interface bridge device according to a third embodiment.

FIG. 12 is a block diagram illustrating an example of effectively using a remaining credit by the interface bridge device according to the third embodiment.

DETAILED DESCRIPTION

Figure 1:
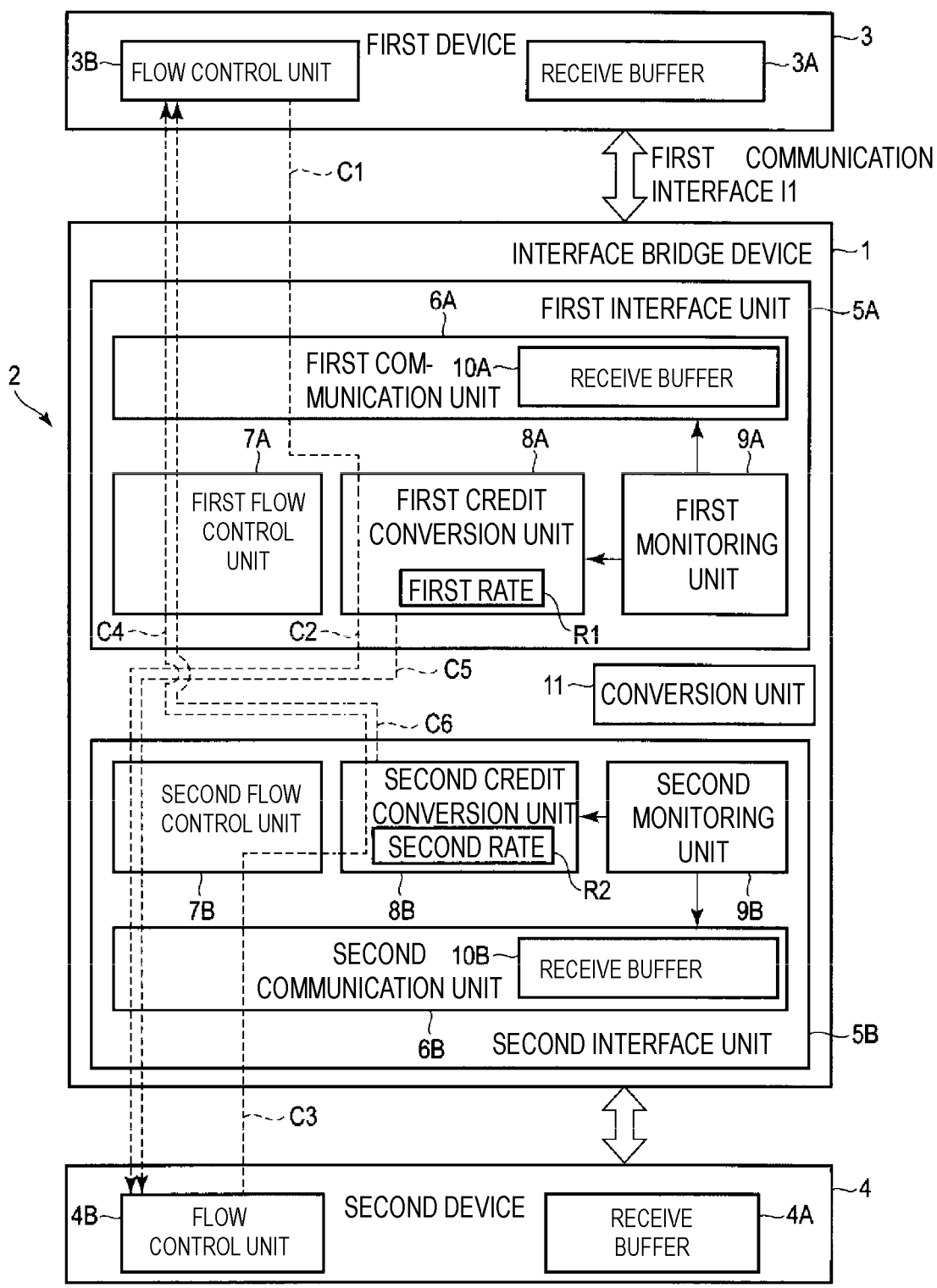
FIG. 1 is a block diagram illustrating an example of a configuration of an interface bridge device according to a first embodiment.

Embodiments provide an interface device, a program, and a data communication method which enable a high-speed communication between devices that conform to different communication interfaces.

In general, according to one embodiment, an interface device includes a conversion circuit configured to convert first data that conforms to a first communication interface standard into second data that conforms to a second communication interface standard, and convert third data that conforms to the second communication interface standard into fourth data that conforms to the first communication interface standard, a first flow control unit configured to execute a first flow control that conforms to the first communication interface standard, on the first device, a second flow control unit configured to execute a second flow control that conforms to the second communication interface standard, on the second device, a first communication circuit configured to receive data from and transmit data to the first device under control of the first flow control unit, and a second communication circuit configured to receive data from and transmit data to the second device under control of the second flow control unit. Data is transmitted from the second device to the first device in accordance with a first credit used in the first flow control and a second credit used in the second flow control, and a data amount associated with the first credit is equivalent to a data amount associated with the second credit.

Hereinafter, embodiments of the present disclosure will be described with reference to the accompanying drawings. In the following description, components having the same or substantially the same function will be denoted by the same reference numerals, and overlapping descriptions thereof will only be made as necessary. The present embodiment depicts a device and a method for embodying the technical idea of the present disclosure, but the technical idea of the present disclosure is not limited to, for example, the material, shape, structure, and arrangement described hereinbelow. The technical idea of the present disclosure may be modified in various ways within the scope of the claims.

In the present embodiment, descriptions will be made on an interface device for converting a first data communication that conforms to a first communication interface into a second data communication that conforms to a second communication interface. Hereinafter, an interface device which enables a communication of a command and/or data (hereinafter, referred to as "command/data") between devices using communication interfaces having different protocols will be referred to as an interface bridge device.

It is assumed that the first communication interface connects, for example, various servers or devices to each other by a single protocol to serve as an interface suitable for a multipoint-to-multipoint communication. The standard of the first communication interface is, for example, but not limited to, the Gen-Z standard.

It is assumed that the second communication interface is, for example, an interface for a high-speed and coherent peer-to-peer connection between a server and a field programmable gate array (FPGA). The standard of the second communication interface is, for example, the OPENCAPI® standard, but is not limited thereto. For example, PCI Express® may be used.

In the present embodiment, "credit" refers to, for example, a capacity of a buffer memory of a receiving-side device. In other words, "credit" refers to, for example, a data amount permitted to be transmitted from the transmitting-side device.

The flow control refers to a control for checking the credit of the buffer memory of the receiving-side device and enabling the transmitting-side device to communicate the command/data according to the credit of the receiving-side device. In the present embodiment, permitting the transmitting-side device to conduct the communication according to the credit of the receiving-side device will be referred to as assigning a credit.

Since the present embodiment includes the credit conversion and the flow control, the credit conversion and the flow control will be described in detail. Descriptions of other controls which are necessary for conversion of a communication interface but are not related to the credit conversion and the flow control will be omitted or provided in a brief manner.

FIG. 1 is a block diagram illustrating an example of a configuration of an interface bridge device 1 according to the present embodiment. FIG. 1 illustrates only the components that are related to the credit conversion and the flow control, and omits the illustration of other components.

A communication system 2 includes a first device 3, a second device 4, and an interface bridge device 1 that relays data communication between the first device 3 and the second device 4. In the present embodiment, the first device 3 may be a transmitting-side device or a receiving-side device. Likewise, the second device 4 may be a transmitting-side device or a receiving-side device.

The first device 3 may be, for example, a host device, a server, a system on a chip (SoC), an FPGA, a memory device, an accelerator, a processor, or an input/output device. The first device 3 includes a receive buffer memory 3A that stores the command/data received from the interface bridge device 1, and a flow control unit 3B. The flow control unit 3B executes a flow control that conforms to a first communication interface I1.

The first device 3 performs a command/data communication that conforms to the first communication interface I1.

The second device 4 may be, for example, any of the various types of devices described above for the first device 3. The second device 4 includes a receive buffer memory 4A that stores the command/data received from the interface bridge device 1, and a flow control unit 4B. The flow control unit 4B executes a flow control that conforms to a second communication interface I2.

The second device 4 performs a command/data communication that conforms to the second communication interface I2.

The first device 3 and the second device 4 are able to communicate with each other via the interface bridge device 1.

The interface bridge device 1 is connected to the first device 3 to be able to communicate with the first device 3, and connected to the second device 4 to be able to communicate with the second device 4.

The interface bridge device 1 is implemented as an electronic circuit. Alternatively, the interface bridge device 1 may be implemented in firmware that is executed by a processor control unit, such that each of the sub-units of the interface bridge device 1, described below, is implemented in the firmware that is executed by the processor.

The interface bridge device 1 includes a conversion unit 11, a first interface unit 5A, and a second interface unit 5B.

The conversion unit 11 receives first data that conforms to the first communication interface I1 (corresponding to command/data D1 in FIG. 3 to be described later) from the first device 3 via the first interface unit 5A. Then, the conversion unit 11 converts the first data into second data that conforms to the second communication interface I2 (corresponding to command/data D2 in FIG. 3 to be described later). Then, the conversion unit 11 transmits the second data to the second device 4 via the second interface unit 5B.

In reverse, the conversion unit 11 receives third data that conforms to the second communication interface I2 (corresponding to command/data D3 in FIG. 2 to be described later) from the second device 4 via the second interface unit 5B. Then, the conversion unit 11 converts the third data into fourth data that conforms to the first communication interface I1 (corresponding to command/data D4 in FIG. 2 to be described later). Then, the conversion unit 11 transmits the fourth data to the first device 3 via the first interface unit 5A.

The first interface unit 5A converts a credit C1 that conforms to the first communication interface I1 into a credit C2 that conforms to the second communication interface I2. The first interface unit 5A includes a first communication unit 6A, a first flow control unit 7A, a first credit conversion unit 8A, and a first monitoring unit 9A. In addition, the first communication unit 6A includes a receive buffer memory 10A.

The second interface unit 5B converts a credit C3 that conforms to the second communication interface I2 into a credit C4 that conforms to the first communication interface I1. The second interface unit 5B includes a second communication unit 6B, a second flow control unit 7B, a second credit conversion unit 8B, and a second monitoring unit 9B. In addition, the second communication unit 6B includes a receive buffer memory 10B.

In the present embodiment, the first interface unit 5A and the second interface unit 5B may be combined with each other or further divided. In addition, the respective components of the first interface unit 5A and the respective components of the second interface unit 5B may be combined with each other or may be further divided. Specifically, for example, the first communication unit 6A and the second communication unit 6B may be combined with each other, the first flow control unit 7A and the second flow control unit 7B may be combined with each other, the first credit conversion unit 8A and the second credit conversion unit 8B may be combined with each other, and the first monitoring unit 9A and the second monitoring unit 9B may be combined with each other. In addition, the receive buffer memory 10A and the receive buffer memory 10B may be combined with each other. In another example, the receive buffer memory 10A may be separated from the first communication unit 6A, and the receive buffer memory 10B may be separated from the second communication unit 6B.

The first communication unit 6A performs transmission and reception of the command/data with the first device 3. The first communication unit 6A stores the command/data received from the first device 3 in the first receive buffer memory 10A.

When information on the credit C1 related to the receive buffer memory 3A of the first device 3 is received via the first communication unit 6A, the first flow control unit 7A executes the first flow control that conforms to the first communication interface I1 based on the credit C1. Further, the first flow control unit 7A notifies the first credit conversion unit 8A of the credit C1.

The first credit conversion unit 8A converts the credit C1 received in the first flow control unit 7A according to a first rate R1 into the credit C2 that conforms to the second communication interface I2, and notifies the second flow control unit 7B of the converted credit C2. More specifically, the first credit conversion unit 8A converts the credit C1 into the credit C2 corresponding to a data amount that is transmittable to the first device 3.

The first rate R1 represents the number of units of the credit that conforms to the second communication interface I2, which corresponds to a predetermined number of units of the credit that conforms to the first communication interface I1.

When the credit C2 obtained from the conversion by the first credit conversion unit 8A is received, the second flow control unit 7B executes the second flow control that conforms to the second communication interface I2, based on the credit C2. Further, the second flow control unit 7B transmits the information of the credit C2 to the second device 4 via the second communication unit 6B.

As a result, the credit C2 corresponding to the credit C1 of the first device 3 which is the receiving-side device is notified to the second device 4 which is the transmitting-side device.

The second device 4 transmits the command/data to the first device 3 via the interface bridge device 1 according to the credit C2.

In the related art, it is assumed that the credit C1 is smaller than the credit C2 by a specific level or more (C1<<C2). The interface bridge device 1 receives the third data from the second device 4 according to the credit C2, and converts the third data into the fourth data. However, when the credit C1 is smaller than the credit C2 by a specific level or more, it may be difficult for the interface bridge device 1 to transmit all of the converted fourth data to the first device 3 according to the credit C1 within a predetermined time period. When all of the fourth data may not be transmitted to the first device 3 within a predetermined time period, the interface bridge device 1 transmits a portion of the fourth data to the first device 3 according to the credit C1, and holds the other portion of the fourth data until a communication becomes possible. Thus, the other portions of the fourth data stay in the interface bridge device 1, and as a result, a delay occurs in the data communication.

Meanwhile, in the present embodiment, the credits C1 and C2 are converted to be substantially equivalent to each other as described above. Thus, the interface bridge device 1 may convert the third data of the data amount that can be communicated according to the credit C2 into the fourth data, and transmit the fourth data to the first device 3 according to the credit C1 within a predetermined time period. Accordingly, in the present embodiment, the command/data communication can be prevented from being in a waiting state in the interface bridge device 1.

Here, the waiting state indicates a state where the interface bridge device 1 is assigned with no credit necessary for a transmission, from the first device 1 which is the receiving-side device, and thus, is unable to smoothly transmit the fourth data to the first device 3. In the present embodiment, the credit C2 is assigned to the second device 4 according to the credit C1 assigned from the first device 3. Thus, it is possible to prevent the occurrence of the data transmission waiting in the interface bridge device 1, and the latency is reduced so that a large-capacity buffer memory for storing the transmission waiting data does not need to be provided.

The first monitoring unit 9A monitors, for example, the first communication unit 6A, so as to monitor a first actually used credit used when the fourth data is transmitted from the conversion unit 11 to the first device 3 (corresponding to a first actually used credit AC1 in FIG. 2 to be described later). The first monitoring unit 9A may monitor the first communication unit 6A, for example, at a predetermined time interval or when a predetermined condition is satisfied.

Then, the first monitoring unit 9A notifies the first credit conversion unit 8A of the first actually used credit.

For example, the first credit conversion unit 8A subtracts the first actually used credit from the credit C1 retained by the first device 3, to obtain a first remaining credit (corresponding to a first remaining credit RC1 in FIG. 2 to be described later).

For example, when the first remaining credit is equal to or larger than a transmission unit of the first communication interface I1, the first credit conversion unit 8A obtains a credit C5 by converting the first remaining credit and adding the converted credit amount to the credit C2 used in the second flow control.

The first credit conversion unit 8A notifies the second flow control unit 7B of the credit C5 that conforms to the second communication interface I2.

The second flow control unit 7B executes the second flow control that conforms to the second communication interface I2, based on the credit C5 received from the first credit conversion unit 8A. Further, the second flow control unit 7B transmits the information of the credit C5 to the second device 4 via the second communication unit 6B.

Accordingly, when the first remaining credit remains in a sufficient amount for one transmission unit, a credit conversion for effectively using the first remaining credit may be executed.

For more detailed description, the credit C1 and the credit C2 obtained by converting the credit C1 may not be equivalent to each other, and may be different in capacity from each other. When the first actually used credit is not exactly the same as the credit C2, the first remaining credit is generated. When the first remaining credit becomes equal to or larger than one transmission unit of the first communication interface I1, the interface bridge device 1 assigns the credit C5, instead of the credit C2, to the second device 4.

The second communication unit 6B performs transmission and reception of the command/data with the second device 4. The second communication unit 6B stores the command/data received from the second device 4 in the second receive buffer memory 10B.

When the information of the credit C3 related to the receive buffer memory 4A of the second device 4 is received via the second communication unit 6B, the second flow control unit 7B executes a flow control of the communication that conforms to the second communication interface I2, based on the credit C3. Further, the second flow control unit 7B notifies the second credit conversion unit 8B of the credit C3.

The second credit conversion unit 8B converts the credit C3 received from the second flow control unit 7B according to a second rate R2 into the credit C4 that conforms to the first communication interface I1, and transmits the converted credit C4 to the first flow control unit 7A. More specifically, the second credit conversion unit 8B converts the credit C3 into the credit C4 corresponding to a data amount that is transmittable to the second device 4.

The second rate R2 represents the number of units of the credit that conforms to the first communication interface I1, which corresponds to a predetermined number of units of the credit that conforms to the second communication interface I2.

When the credit C4 obtained by the conversion in the second credit conversion unit 8B is received, the first flow control unit 7A executes a flow control of the communication that conforms to the first communication interface I1 based on the credit C4. Further, the first flow control unit 7A transmits the information of the credit C4 to the first device 3 via the first communication unit 6A.

As a result, the credit C4 corresponding to the credit C3 of the first device 3 which is the receiving-side device is notified to the first device 3 which is the transmitting-side device.

The first device 3 transmits the command/data to the second device 4 via the interface bridge device 1 according to the credit C4.

In the related art, it is assumed that the credit C3 is smaller than the credit C4 by a specific level or more (C3<<C4). The interface bridge device 1 receives the first data from the first device 3 according to the credit C4, and converts the first data into the second data. However, when the credit C3 is smaller than the credit C4 by a specific level or more, it may be difficult for the interface bridge device 1 to transmit all of the converted second data to the second device 4 according to the credit C3 within a predetermined time period. When all of the second data may not be transmitted to the second device 4 within a predetermined time period, the interface bridge device 1 transmits a portion of the second data to the second device 4 according to the credit C3, and holds the other portion of the second data until a communication becomes possible. As a result, a delay occurs in the data communication.

Meanwhile, in the present embodiment, the credits C3 and C4 are converted to be substantially equivalent to each other as described above. Thus, the interface bridge device 1 may convert the first data of the data amount that can be communicated according to the credit C4 into the second data, and transmit the second data to the second device 4 according to the credit C3 within a predetermined time period. Thus, in the present embodiment, the command/data communication is prevented from being in the waiting state in the interface bridge device 1, so that the latency can be reduced. Thus, the interface bridge device 1 may not include a large-capacity buffer memory for storing the transmission waiting data.

The second monitoring unit 9B monitors, for example, the second communication unit 6B, so as to monitor a second actually used credit used when the second data is transmitted from the conversion unit 11 to the second device 4 (corresponding to a second actually used credit AC2 in FIG. 3 to be described later). The second monitoring unit 9B may monitor the second communication unit 6B, for example, at a predetermined time interval or when a predetermined condition is satisfied.

Then, the second monitoring unit 9B notifies the second credit conversion unit 8B of the second actually used credit.

For example, the second credit conversion unit 8B subtracts the second actually used credit from the credit C3 retained by the second device 4, to obtain a second remaining credit (corresponding to a second remaining credit RC2 in FIG. 3 to be described later).

For example, when the second remaining credit is equal to or larger than a transmission unit of the second communication interface I2, the second credit conversion unit 8B obtains a credit C6 by converting the second remaining credit and adding the converted credit amount to the credit C4 used in the first flow control.

The second credit conversion unit 8B notifies the first flow control unit 7A of the credit C6 that conforms to the first communication interface I1.

The first flow control unit 7A executes the first flow control that conforms to the first communication interface I1, based on the credit C6 received from the second credit conversion unit 8B. Further, the first flow control unit 7A transmits the information of the credit C6 to the first device 3 via the first communication unit 6A.

Accordingly, when the second remaining credit remains in a sufficient amount for one transmission unit, a credit conversion for effectively using the second remaining credit may be executed.

In the present embodiment, the flow of the transmission of command/data from the first device 3 to the second device 4 via the interface bridge device 1 and the flow of the transmission of command/data from the second device 4 to the first device 3 via the interface bridge device 1 may be independently executed. Accordingly, the assignment of credit C1 may be executed in parallel with the assignment of credit C3 and/or credit C4. Similarly, the assignment of credit C2 may be executed in parallel with the assignment of credit C3 and/or credit C4.

FIG. 2 is a block diagram illustrating an example of a communication system 2 in which an amount of a communication of command/data D3 by the second device 4 is controlled based on the credit C1 related to the first device 3. In addition, the hatched portions in the receive buffer memories 3A and 10B of FIG. 2 indicate memory areas that are being used, and the blank portions indicate unused memory areas. In the other drawings hereinbelow as well, the hatched portions in the receive buffer memories 3A, 4A, 10A, and 10B indicate memory areas that are being used, and the blank portions indicate unused memory areas.

In FIG. 2, the first device 3 is the receiving-side device, the second device 4 is the transmitting-side device, and the credit C1 corresponding to the first device 3 is converted into the credit C2 corresponding to the second device 4.

First, the first device 3 assigns the credit C1 to the interface bridge device 1.

The interface bridge device 1 converts the credit C1 that conforms to the first communication interface I1 into the credit C2 that conforms to the second communication interface I2 and is substantially equivalent to the credit C1. Then, the interface bridge device 1 notifies the second device 4 of the information of the credit C2.

When the credit C1 is converted into the credit C2, the interface bridge device 1 uses the number of units of the credit that conforms to the second communication interface I2, which corresponds to a predetermined number of units of the credit that conforms to the first communication interface I1.

As a result, the credit C2 obtained by converting the credit C1 corresponding to the first device 3 is assigned to the second device 4.

The second device 4 transmits the command/data D3 to the interface bridge device 1 according to the credit C2, and the interface bridge device 1 transmits command/data D4 to the first device 3 according to the credit C1.

Then, the interface bridge device 1 monitors the first actually used credit AC1 between the first device 3 and the interface bridge device 1, and updates the credit C2 assigned from the interface bridge device 1 to the second device 4, to the credit C5. FIG. 2 indicates the credit C5 by a dashed line, to represent that the interface bridge device 1 assigns the credit C5, instead of the credit C2, to the second device 4.

Specifically, for example, when the first remaining credit RC1 obtained by subtracting the first actually used credit AC1 from the credit C1 remains in a sufficient amount for one transmission unit, the interface bridge device 1 obtains the credit C5 that is able to use the first remaining credit RC1 and conforms to the second communication interface I2. Then, the interface bridge device 1 assigns the credit C5 to the second device 4.

In addition, it is assumed that the data capacity of the receive buffer memory 10B of the interface bridge device 1 is equal to or larger than the data capacity of the receive buffer memory 3A of the first device 3.

FIG. 3 is a block diagram illustrating an example of the communication system 2 in which an amount of a communication of command/data D1 by the first device 3 is controlled based on the credit C3 related to the second device 4.

FIG. 3 represents a communication which is reverse in direction to that in FIG. 2. In FIG. 3, the second device 4 is a receiving-side device, the first device 3 is a transmitting-side device, and the credit C3 corresponding to the second device 4 is converted into the credit C4 corresponding to the first device 3.

First, the second device 4 assigns the credit C3 to the interface bridge device 1.

The interface bridge device 1 converts the credit C3 that conforms to the second communication interface I2 into the credit C4 that conforms to the first communication interface I1 and is substantially equivalent to the credit C3. Then, the interface bridge device 1 notifies the first device 3 of the information of the credit C4.

When the credit C3 is converted into the credit C4, the interface bridge device 1 uses the number of units of the credit that conforms to the first communication interface I1, which corresponds to a predetermined number of units of the credit that conforms to the second communication interface I2.

As a result, the credit C4 obtained by converting the credit C3 corresponding to the second device 4 is assigned to the first device 3.

The first device 3 transmits the command/data D1 to the interface bridge device 1 according to the credit C4, and the interface bridge device 1 transmits the command/data D2 to the second device 4 according to the credit C3.

Then, the interface bridge device 1 monitors the second actually used credit AC2 between the second device 4 and the interface bridge device 1, and updates the credit C4 assigned from the interface bridge device 1 to the first device 3,d to the credit C6. FIG. 3 indicates the credit C6 by a dashed line, to represent that the interface bridge device 1 assigns the credit C6, instead of the credit C4, to the first device 3.

Specifically, for example, when the second remaining credit RC2 obtained by subtracting the second actually used credit AC2 from the credit C3 remains in a sufficient amount for one transmission unit, the interface bridge device 1 obtains the credit C6 that is able to use the second remaining credit RC2 and conforms to the first communication interface I1. Then, the interface bridge device 1 assigns the credit C6 to the first device 3.

In addition, in FIG. 3, it is assumed that the data capacity of the receive buffer memory 10A of the interface bridge device 1 is equal to or larger than the data capacity of the receive buffer memory 4A of the second device 4.

FIG. 4 is a view illustrating an example of a result of comparison between the first communication interface I1 and the second communication interface I2 according to the present embodiment.

The credit management unit of the first communication interface I1 is a packet credit. The packet credit is a credit for managing communication of packets. The packets include a command and data.

The first communication interface I1 assigns a credit in a unit of, for example, 16 bytes, as the packet credit.

In the first communication interface I1, the credit refers to, for example, the remaining capacity of the receive buffer memory.

In the first communication interface I1, it is assumed that the minimum packet length is, for example, 8 bytes.

Meanwhile, the credit management unit of the second communication interface I2 may be a command credit or a data credit. The command credit is a credit for managing communication of control flits including one or more commands. The data credit is a credit for managing communication of data flits including one or more pieces of data.

The second communication interface I2 assigns a credit in the unit of, for example, one command as the command credit.

The second communication interface I2 assigns a credit in the unit of, for example, 64 bytes, as the data credit.

In the second communication interface I2, the credit is expressed by, for example, the number of pieces of command/data permitted to be transmitted.

In the second communication interface I2, the maximum command length is, for example, 21 bytes (3.5 bytes×6 slots).

As illustrated in FIG. 4, in the present embodiment, the credits of the flow controls that conform to the two different communication interfaces I1 and I2 are adjusted to be substantially equivalent to each other.

Figure 5:
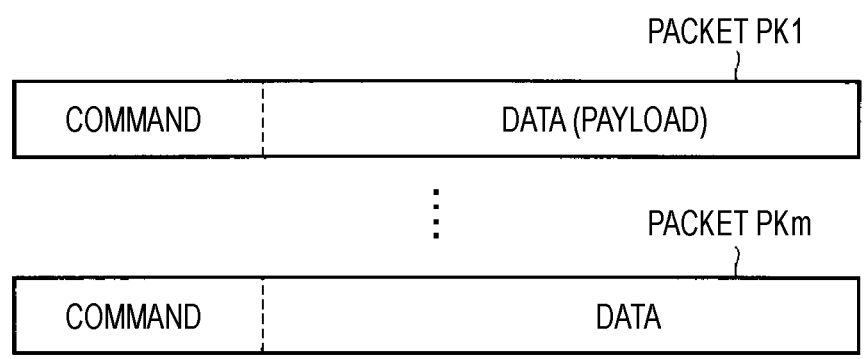
FIG. 5 is a block diagram illustrating an example of a format of packets that conform to the first communication interface.

FIG. 5 is a block diagram illustrating an example of a format of packets PK1 to PKm that conform to the first communication interface I1.

Each of the packets PK1 to PKm includes a command and data (or a payload). The packets PK1 to PKm may have, for example, a variable length.

Figure 6:
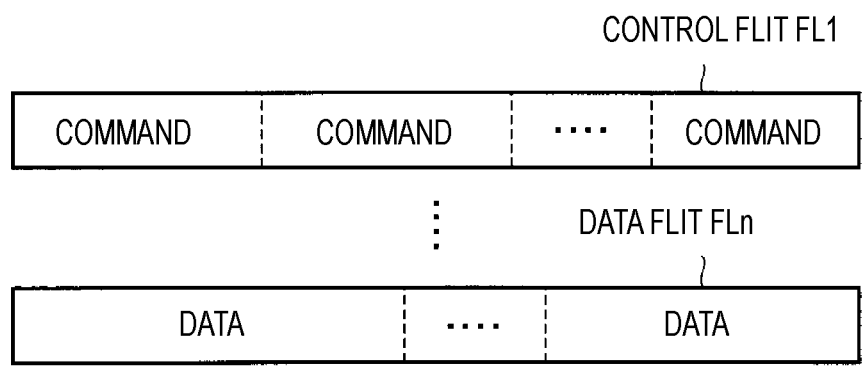
FIG. 6 is a block diagram illustrating an example of a format of flits that conform to the second communication interface.

FIG. 6 is a block diagram illustrating an example of a format of flits FL1 to FLn that conform to the second communication interface I2.

The flit refers to, for example, a minimum unit of the flow control. In the second communication interface I2, one or more commands are stored in a control flit FL1. In addition, one or more pieces of data are stored in a data flit FLn.

Each of the control flit FL1 and the data flit FLn may have a fixed length which may be, for example, 64 bytes.

Figure 7:
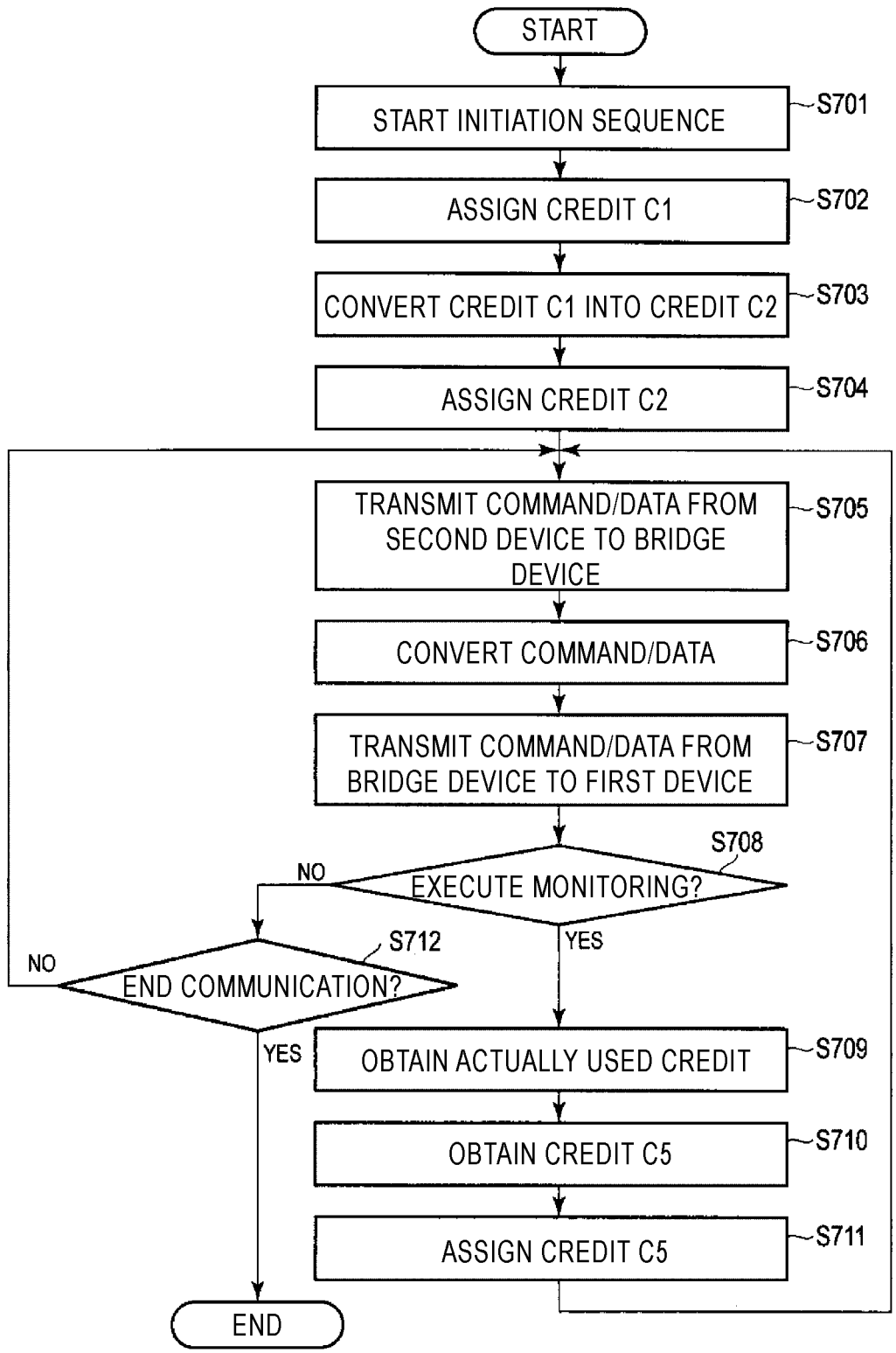
FIG. 7 is a flowchart of a first process carried out by an interface bridge device, according to the first embodiment.

FIG. 7 is a flowchart illustrating an example of the process carried out by the interface bridge device 1 according to the present embodiment.

In FIG. 7, a case where the command/data is transmitted from the second device 4 to the first device 3 via the interface bridge device 1 will be described as an example.

In step S701, the communication system 2 starts an initialization sequence including initialization and synchronization of an interface physical layer, and establishment of a link.

In step S702, the first flow control unit 7A receives the information on the credit C1 from the first device 3 via the first communication unit 6A, and notifies the first credit conversion unit 8A of the credit C1. Step S702 corresponds to the assignment of credit C1.

In step S703, the first credit conversion unit 8A converts the credit C1 that conforms to the first communication interface I1 into the credit C2 that conforms to the second communication interface I2 and is equivalent in data size to the credit C1, and notifies the second flow control unit 7B of the credit C2.

In step S704, the second flow control unit 7B transmits the information on the credit C2 to the second device 4 via the second communication unit 6B. Step S704 corresponds to the assignment of credit C2.

In step S705, the second communication unit 6B receives the command/data D3 that conforms to the second communication interface I2, from the second device 4, and stores the received command/data D3 in the receive buffer memory 10B.

In step S706, the conversion unit 11 converts the command/data D3 of the receive buffer memory 10B into the command/data D4 that conforms to the first communication interface I1.

In step S707, the first communication unit 6A transmits the command/data D4 that conforms to the first communication interface I1, to the first device 3.

In step S708, the first monitoring unit 9A determines whether to execute the monitoring of the first actually used credit AC1.

When it is determined to execute the monitoring, the first monitoring unit 9A obtains the first actually used credit AC1 which is an actually used amount of the credit, in step S709.

In step S710, the first credit conversion unit 8A obtains the first remaining credit RC1 by subtracting the first actually used credit AC1 from the credit C1 assigned by the first flow control, obtains the credit C5 corresponding to the data amount obtained by adding the first remaining credit RC1 to the credit C2 assigned by the second flow control, and notifies the second flow control unit 7B of a request for the conversion from the credit C2 into the credit C5.

In step S711, the second flow control unit 7B transmits the information on the credit C5 to the second device 4 via the second communication unit 6B. Step S711 corresponds to the assignment of credit C5.

Then, the process proceeds to step S705.

When it is determined not to execute the monitoring in step S708, the interface bridge device 1 determines whether to end the communication, in step S712.

When it is determined not to end the communication, the process proceeds to step S705. When it is determined to end the communication, the process is ended.

Figure 8:
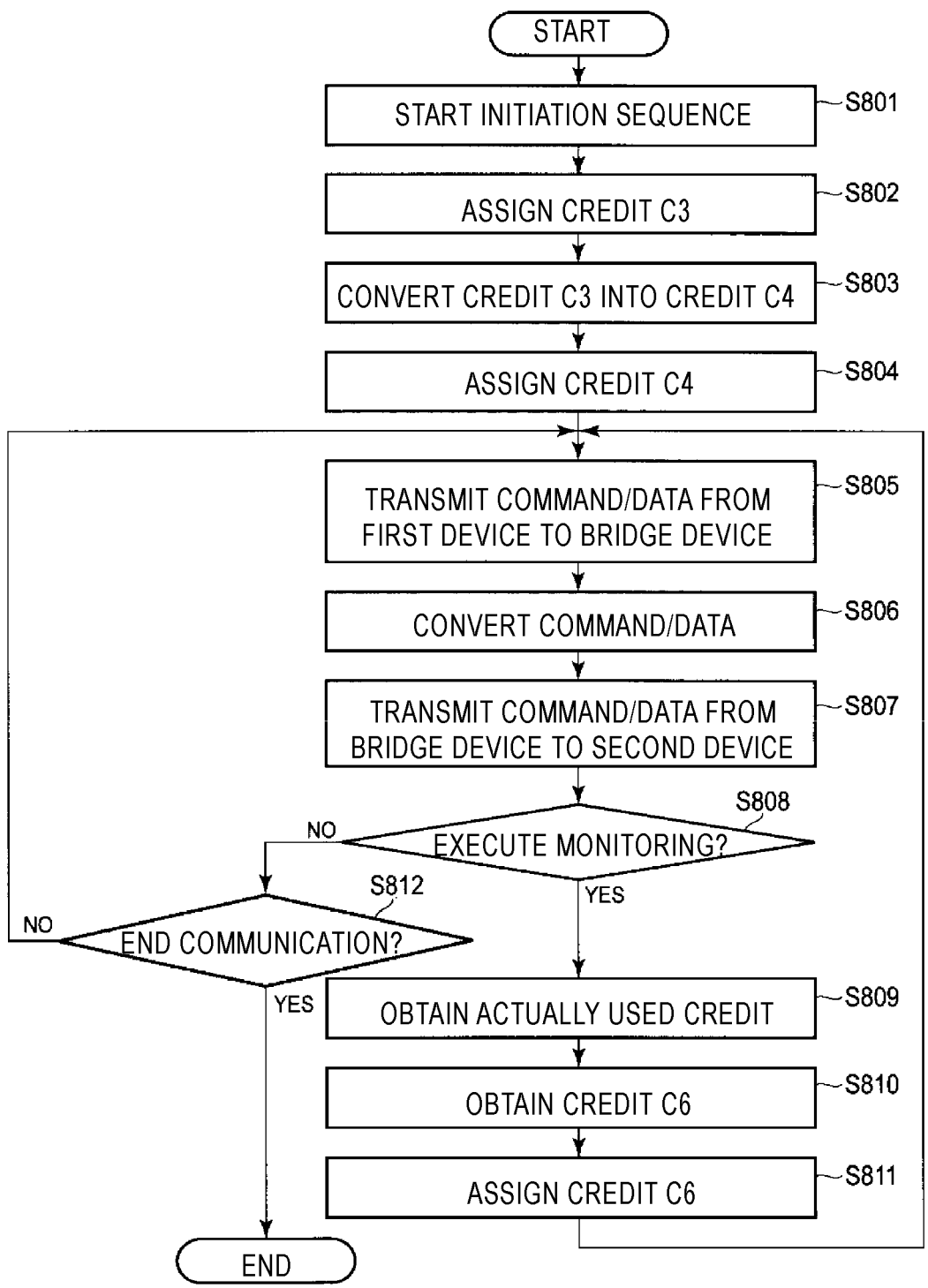
FIG. 8 is a flowchart of a second process carried out by the interface bridge device, according to the first embodiment.

FIG. 8 is a flowchart illustrating a second example of the process of the interface bridge device 1 according to the present embodiment.

In FIG. 8, a case where the command/data is transmitted from the first device 3 to the second device 4 via the interface bridge device 1 will be described as an example.

In step S801, the communication system 2 starts the initialization sequence.

In step S802, the second device 4 assigns the credit C3 to the interface bridge device 1.

In step S803, the second credit conversion unit 8B converts the credit C3 into the credit C4.

In step S804, the first flow control unit 7A assigns the credit C4 to the first device 3.

In step S805, the first communication unit 6A receives the command/data D1 from the first device 4.

In step S806, the conversion unit 11 converts the command/data D1 into the command/data D2.

In step S807, the second communication unit 6B transmits the command/data D2 to the second device 4.

In step S808, the second monitoring unit 9B determines whether to execute the monitoring of the second actually used credit AC2.

When it is determined to execute the monitoring, the second monitoring unit 9B obtains the second actually used credit AC2 which is an actually used amount of the credit, in step S809.

In step S810, the second credit conversion unit 8B obtains the second remaining credit RC2 by subtracting the second actually used credit AC2 from the credit C3, obtains the credit C6 corresponding to the data amount obtained by adding the second remaining credit RC2 to the credit C4, and notifies the first flow control unit 7A of a request for the conversion from the assigned credit C4 to the credit C6.

In step S811, the first flow control unit 7A assigns the credit C6 to the first device 3.

Then, the process proceeds to step S805.

When it is determined in step S808 not to execute the monitoring, the interface bridge device 1 determines whether to end the communication, in step S812.

When it is determined not to end the communication, the process proceeds to step S805. When it is determined to end the communication, the process is ended.

Hereinafter, effects obtained by the present embodiment will be described.

In a bridge device of a comparative example where the credit management is executed in a unit of a link of a data communication, the credit between the receiving-side device and the bridge device and the credit between the transmitting-side device and the bridge device are asynchronous with each other. Thus, when the credit management is executed in the unit of the link of the data communication, the credit assigned to a first device may become smaller than the credit assigned to a second device. In this case, the bridge device of the comparative example is unable to convert the data received according to the credit of the second device and transmit the converted data according to the credit of the first device within a predetermined time period, so that the latency may increase. When the latency increases in the bridge device of the comparative example, the data held in the bridge device of the comparative example increases, so that it is necessary to retain a large-capacity buffer memory, and costs may increase.

Meanwhile, in the interface bridge device 1 according to the present embodiment, the credit to be assigned to the transmitting-side device is determined according to the amount of command/data that is receivable by the receiving-side device. The transmitting-side device executes the data communication within the range of the determined credit, and does not execute the data communication that exceeds the credit. In other words, the credit between the receiving-side device and the bridge device and the credit between the transmitting-side device and the bridge device are synchronized with each other. Thus, in the present embodiment, the sizes of the receive buffer memories 10A and 10B can be reduced, so that the manufacturing cost can be reduced. Further, it is possible to prevent the occurrence of the situation where the command/data transmitted from the transmitting-side device is held in the receive buffer memories 10A and 10B for a long time so that a delay occurs in the interface bridge device 1. Thus, the communication system 2 causing the low latency can be implemented.

In the present embodiment, the credit assigned to the receiving-side device by the interface bridge device 1 is reflected in the credit between the interface bridge device 1 and the transmitting-side device. In the present embodiment, with respect to the two communication interfaces I1 and I2 which are different in unit of a credit from each other, the credits may be converted to be equivalent to each other. In the present embodiment, the credit between the two different communication interfaces I1 and I2 which are used for the bidirectional communication is adjusted so that the data communication can be facilitated, and the data link transparency from the transmitting-side device to the receiving-side device can be improved. As a result, the latency of the communication system 2 can be reduced.

In the present embodiment, the remaining credit between the receiving-side device and the interface bridge device 1 may be fed back to the credit between the transmitting-side device and the interface bridge device 1, so that the data communication can be effectively executed by the communication system 2.

In the present embodiment, the assignment of credits may be executed in parallel, so that the process time for assigning credits can be reduced.

Second Embodiment

The second embodiment describes a specific example of the first embodiment. In the second embodiment, descriptions will be made on an example where the interface bridge device 1 converts the command/data D3 that conforms to the second communication interface I2 into the command/data D4 that conforms to the first communication interface I1.

FIG. 9 is a block diagram illustrating an example of credit conversion by the interface bridge device 1 according to the second embodiment.

A process PA1 converts six packet credits (e.g., 96 bytes) of the first communication interface I1 into one command credit and one data credit of the second communication interface I2.

Specifically, for example, it is assumed that the maximum length of the command credit of the second communication interface I2 is 21 bytes. In this case, two (32 bytes) of the packet credits of the first communication interface I1 are assigned to one command credit of the second communication interface I2.

Further, for example, it is assumed that the data credit of the second communication interface I2 is 64 bytes. In this case, four (64 bytes) of the packet credits of the first communication interface I1 are assigned to one data credit of the second communication interface I2.

As a result, the six packet credits PC of the first communication interface I1 are converted into one command credit CC1 and one data credit DC1 of the second communication interface I2, as in the above-described process PA1.

FIG. 10 is a block diagram illustrating an example of effectively using the remaining credits by the interface bridge device 1 according to the second embodiment.

After the credits are assigned by the process PA1 of FIG. 9, the second device 4 transmits the command/data D3 that conforms to the second communication interface I2, to the interface bridge device 1. The interface bridge device 1 receives the command/data D3 that conforms to the second communication interface I2, from the second device 4, converts the received command/data D3 into the command/data D4 (e.g., packets) that conforms to the first communication interface I1, and transmits the command/data D4 to the first device 3.

A process PA2 of FIG. 10 monitors the first actually used credit AC1 used in the receive buffer memory 3A of the first device 3. Then, the process PA2 subtracts the first actually used credit AC1 from the six packet credits (e.g., 96 bytes) of the first communication interface I1, to obtain the first remaining credit RC1 of the first communication interface I1.

When the first remaining credit RC1 is equal to or larger than the data amount that requires the execution of the credit conversion (e.g., one transmission unit of the first communication interface I1), a process PA3 converts the credit that is able to effectively use the first remaining credit RC1 and conforms to the first communication interface I1 into a command credit CC2 and a data credit DC2 of the second communication interface I2. FIG. 10 indicates the command credit CC2 and the data credit DC2 by dashed lines, to represent that the interface bridge device 1 assigns the command credit CC2 and the data credit DC2 of FIG. 10, instead of the above-described command credit CC1 and data credit DC1 of FIG. 9, to the second device 4.

As described above, in the second embodiment, the credit that conforms to the first communication interface I1 may be appropriately converted into the credit that conforms to the second communication interface I2 and is substantially equivalent to the credit that conforms to the first communication interface I1.

In addition, in the second embodiment, the first actually used credit AC1 that conforms to the first communication interface I1 is obtained, and the first actually used credit AC1 is subtracted from the assigned credit, so that the first remaining credit RC1 can be calculated.

In the second embodiment, the credit to be assigned to the second device 4 may be appropriately converted into the credit that conforms to the second communication interface I2 and is able to effectively use the first remaining credit RC1.

Third Embodiment

The third embodiment describes a specific example of the first embodiment. In the third embodiment, descriptions will be made on an example where the interface bridge device 1 converts the command/data D1 that conforms to the first communication interface I1 into the command/data D2 that conforms to the second communication interface I2.

FIG. 11 is a block diagram illustrating an example of credit conversion by the interface bridge device 1 according to the third embodiment.

A process PB1 converts two command credits and one data credit of the second communication interface I2 into one packet credit (e.g., 16 bytes) of the first communication interface I1.

Specifically, for example, it is assumed that the shortest command credit of the second communication interface I2 is 8 bytes. When no data (e.g., payload) exists, maximum two shortest command credits may be allocated to one packet credit of the first communication interface I1. When data exists, one data credit of the second communication interface may be allocated to one packet credit of the first communication interface I1. At the time when the credit conversion is executed, it is unknown in which case of the presence and absence of data the credits of the second communication interface I2 are to be used.

Accordingly, in the process PB1, the two command credits and the one data credit of the second communication interface I2 are converted into one packet credit PC1 of the first communication interface I1 such that the credits of the second communication interface I2 may be used in any of the cases of the presence and absence of data.

FIG. 12 is a block diagram illustrating an example of effectively using the remaining credit by the interface bridge device 1 according to the third embodiment.

After the credits are assigned by the process PB1 of FIG. 11, the first device 3 transmits the command/data D1 (e.g., packet) that conforms to the first communication interface I1, to the interface bridge device 1. The interface bridge device 1 receives the command/data D1 that conforms to the first communication interface I1 from the first device 3, converts the received command/data D1 into the command/data D2 that conforms to the second communication interface I2, and transmits the command/data D2 to the second device 4.

A process PB2 of FIG. 12 monitors the second actually used credit AC2 used in the receive buffer memory 4A of the second device 4. Then, a process PB2 subtracts the second actually used credit AC2 from the credit assigned to the second device 4, to obtain the second remaining credit RC2 of the second communication interface I2.

When the second remaining credit RC2 is equal to or larger than the data amount that requires the execution of the credit conversion (e.g., one transmission unit of the second communication interface I2), the process PB3 converts the credit that is able to effectively use the second remaining credit RC2 and conforms to the second communication interface I2 into the packet credit PC2 of the first communication interface I1. FIG. 12 indicates the packet credit PC2 by a dashed line, to represent that the interface bridge device 1 assigns the packet credit PC2 of FIG. 12, instead of the packet credit PC1 of FIG. 11, to the first device 3.

As described above, in the third embodiment, the credit that conforms to the second communication interface I2 may be appropriately converted into the credit that conforms to the first communication interface I1 and is substantially equivalent to the credit that conforms to the second communication interface I2.

In addition, in the third embodiment, the second actually used credit AC2 that conforms to the second communication interface I2 is obtained, and the second actually used credit AC2 is subtracted from the assigned credit, so that the second remaining credit RC2 may be calculated.

In addition, in the third embodiment, the credit to be assigned to the first device 3 may be appropriately converted into the credit that conforms to the first communication interface I1 and is able to effectively use the second remaining credit RC2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interface device comprising:
    a conversion circuit configured to convert first data that conforms to a first communication interface standard into second data that conforms to a second communication interface standard, and convert third data that conforms to the second communication interface standard into fourth data that conforms to the first communication interface standard;
    a first flow control unit configured to execute a first flow control that conforms to the first communication interface standard;
    a second flow control unit configured to execute a second flow control that conforms to the second communication interface standard;
    a first communication circuit configured to receive data from and transmit data to a first device under control of the first flow control unit;
    a second communication circuit configured to receive data from and transmit data to a second device under control of the second flow control unit; and
    first and second credit conversion units, wherein
    data is transmitted from the second device to the first device through the interface device in accordance with a first credit used in the first flow control and a second credit used in the second flow control, and a data amount associated with the first credit is equivalent to a data amount associated with the second credit,
    data is transmitted from the first device to the second device in accordance with a third credit used in the first flow control and a fourth credit used in the second flow control, and a data amount associated with the third credit is equivalent to a data amount associated with the fourth credit,
    the first credit conversion unit is configured to convert the first credit into the second credit according to a first rate that indicates the number of units of credit that conforms to the second communication interface standard, which corresponds to a predetermined number of units of credit that conforms to the first communication interface standard, and
    the second credit conversion unit is configured to convert the third credit into the fourth credit according to a second rate that indicates the number of units of credit that conforms to the first communication interface standard, which corresponds to a predetermined number of units of credit that conforms to the second communication interface standard.

2. The interface device according to claim 1, wherein
    the first rate indicates that six units of a packet credit that conforms to the first communication interface standard correspond to one unit of a command credit that conforms to the second communication interface standard and one unit of a data credit that conforms to the second communication interface standard, and
    the second rate indicates that two units of a command credit that conforms to the second communication interface standard and one unit of a data credit that conforms to the second communication interface standard correspond to one unit of a packet credit that conforms to the first communication interface standard.

3. The interface device according to claim 1, further comprising:
    a first monitoring unit configured to monitor a first actually used credit used when the first communication circuit transmits the fourth data to the first device; and
    a second monitoring unit configured to monitor a second actually used credit used when the second communication circuit transmits the second data to the second device.

4. The interface device according to claim 3, wherein
    when a first remaining credit obtained by subtracting the first actually used credit from the first credit is equal to or larger than a transmission unit of the first communication interface standard, data is transmitted from the second device to the second communication circuit in accordance with a fifth credit that is converted from the first remaining credit, and
    when a second remaining credit obtained by subtracting the second actually used credit from the third credit is equal to or larger than a transmission unit of the second communication interface standard, data is transmitted from the first device to the first communication circuit in accordance with a sixth credit that is converted from the second remaining credit.

5. The interface device according to claim 1, wherein
    the first communication interface standard is a Gen-Z standard, and
    the second communication interface standard is an OPENCAPI® standard.

6. An interface device comprising:
a conversion circuit configured to convert first data that conforms to a first communication interface standard into second data that conforms to a second communication interface standard, and convert third data that conforms to the second communication interface standard into fourth data that conforms to the first communication interface standard;
a first flow control unit configured to execute a first flow control that conforms to the first communication interface standard;
a second flow control unit configured to execute a second flow control that conforms to the second communication interface standard;
a first communication circuit configured to receive data from and transmit data to a first device under control of the first flow control unit; and
a second communication circuit configured to receive data from and transmit data to a second device under control of the second flow control unit, wherein
data is transmitted from the second device to the first device through the interface device in accordance with a first credit used in the first flow control and a second credit used in the second flow control, and a data amount associated with the first credit is equivalent to a data amount associated with the second credit,
data is transmitted from the first device to the second device in accordance with a third credit used in the first flow control and a fourth credit used in the second flow control, and a data amount associated with the third credit is equivalent to a data amount associated with the fourth credit,
the first credit and the fourth credit that conform to the first communication interface standard are packet credits including command and/or data, and
the second credit and the third credit that conform to the second communication interface standard are a command credit and a data credit.

7. The interface device according to claim 6, wherein
the packet credit is a credit for managing communication of the packet including command and data, and
the command credit is a credit for managing communication of control flits including one or more commands, and the data credit is a credit for managing communication of data flits including one or more pieces of data.

8. A data communication method, comprising:
converting first data that conforms to a first communication interface standard into second data that conforms to a second communication interface standard, and converting third data that conforms to the second communication interface standard into fourth data that conforms to the first communication interface standard;
receiving data from and transmitting data to a first device while executing a first flow control that conforms to the first communication interface standard; and
receiving data from and transmitting data to a second device while executing a second flow control that conforms to the second communication interface standard, wherein
data is transmitted from the second device to the first device in accordance with a first credit used in the first flow control and a second credit used in the second flow control, and a data amount associated with the first credit is equivalent to a data amount associated with the second credit,
data is transmitted from the first device to the second device in accordance with a third credit used in the first flow control and a fourth credit used in the second flow control, and a data amount associated with the third credit is equivalent to a data amount associated with the fourth credit,
the first credit is converted into the second credit according to a first rate that indicates the number of units of credit that conforms to the second communication interface standard, which corresponds to a predetermined number of units of credit that conforms to the first communication interface standard, and
the third credit is converted into the fourth credit according to a second rate that indicates the number of units of credit that conforms to the first communication interface standard, which corresponds to a predetermined number of units of credit that conforms to the second communication interface standard.

9. The method according to claim 8, wherein
the first rate indicates that six units of a packet credit that conforms to the first communication interface standard correspond to one unit of a command credit that conforms to the second communication interface standard and one unit of a data credit that conforms to the second communication interface standard, and
the second rate indicates that two units of a command credit that conforms to the second communication interface standard and one unit of a data credit that conforms to the second communication interface standard correspond to one unit of a packet credit that conforms to the first communication interface standard.

10. The method according to claim 8, wherein
the first credit and the fourth credit that conform to the first communication interface standard are packet credits including command and/or data, and
the second credit and the third credit that conform to the second communication interface standard are a command credit and a data credit.

11. The method according to claim 10, wherein
the packet credit is a credit for managing communication of the packet including command and data, and
the command credit is a credit for managing communication of control flits including one or more commands, and the data credit is a credit for managing communication of data flits including one or more pieces of data.

12. The method according to claim 8, further comprising:
monitoring a first actually used credit used when the fourth data is transmitted to the first device; and
monitoring a second actually used credit used when the second data is transmitted to the second device.

13. The method according to claim 12, further comprising:
when a first remaining credit obtained by subtracting the first actually used credit from the first credit is equal to or larger than a transmission unit of the first communication interface standard, executing the second flow control on data transmitted from the second device in accordance with a fifth credit that is converted from the first remaining credit, and
when a second remaining credit obtained by subtracting the second actually used credit from the third credit is equal to or larger than a transmission unit of the second communication interface standard, executing the first flow control on data transmitted from the first device in accordance with a sixth credit that is converted from the second remaining credit.

14. The method according to claim 8, wherein
the first communication interface standard is a Gen-Z standard, and the second communication interface standard is an OPENCAPI® standard.

\* \* \* \* \*